US012811220B2

(12) United States Patent
Kang et al.

(10) Patent No.: US 12,811,220 B2
(45) Date of Patent: Nov. 24, 2026

(54) POUCH FOR SECONDARY BATTERY FORMED OF MULTIPLE POUCHES, AND SECONDARY BATTERY INCLUDING THE SAME

(71) Applicant: LG Energy Solution, Ltd., Seoul (KR)

(72) Inventors: Gyung Soo Kang, Daejeon (KR); Sang Myeon Lee, Daejeon (KR); Yong Su Choi, Daejeon (KR); Hyung Kyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 385 days.

(21) Appl. No.: 18/583,402

(22) Filed: Feb. 21, 2024

(65) Prior Publication Data

US 2024/0194985 A1 Jun. 13, 2024

Related U.S. Application Data

(63) Continuation-in-part of application No. PCT/KR2022/016345, filed on Oct. 25, 2022.

(30) Foreign Application Priority Data

Nov. 2, 2021 (KR) ........................ 10-2021-0149043

(51) Int. Cl.
*H01M 50/136* (2021.01)
*H01M 50/105* (2021.01)
(Continued)

(52) U.S. Cl.
CPC ....... *H01M 50/136* (2021.01); *H01M 50/105* (2021.01); *H01M 50/119* (2021.01);
(Continued)

(58) Field of Classification Search
None
See application file for complete search history.

(56) References Cited

U.S. PATENT DOCUMENTS

| | | | |
|---|---|---|---|
| 8,394,523 | B2 | 3/2013 | Yeo |
| 2014/0050957 | A1 | 2/2014 | Yang |

(Continued)

FOREIGN PATENT DOCUMENTS

| | | | |
|---|---|---|---|
| CN | 103843170 | A | 6/2014 |
| CN | 204793061 | U | 11/2015 |

(Continued)

OTHER PUBLICATIONS

International Search Report for Application No. PCT/KR2022/016345 mailed Feb. 3, 2023, pp. 1-3.

(Continued)

*Primary Examiner* — Wyatt P McConnell
(74) *Attorney, Agent, or Firm* — Lerner David LLP

(57) ABSTRACT

A secondary battery may include: an electrode assembly in which an electrode and a separator are alternately stacked; a plurality of pouches that surrounds the electrode assembly and seals the electrode assembly; and a spring part that is coupled to the outermost pouch of the plurality of pouches and provides a degree of structural rigidity of the outermost pouch. Additionally, a secondary battery may include: an electrode assembly in which an electrode and a separator are alternately stacked; a plurality of pouches that surrounds the electrode assembly and seals the electrode assembly; an open portion formed at one side of the outermost pouch of the plurality of pouches and passing through a portion of the one side; and a spring part that is coupled to both ends of the open portion and provides a degree of structural rigidity of the outermost pouch.

14 Claims, 8 Drawing Sheets

(51) Int. Cl.

| | |
|---|---|
| ***H01M 50/119*** | (2021.01) |
| ***H01M 50/121*** | (2021.01) |
| ***H01M 50/129*** | (2021.01) |
| ***H01M 50/474*** | (2021.01) |
| ***H01M 50/483*** | (2021.01) |
| ***H01M 50/486*** | (2021.01) |

(52) U.S. Cl.
CPC ....... *H01M 50/121* (2021.01); *H01M 50/129* (2021.01); *H01M 50/474* (2021.01); *H01M 50/483* (2021.01); *H01M 50/486* (2021.01)

(56) References Cited

U.S. PATENT DOCUMENTS

| | | | | |
|---|---|---|---|---|
| 2015/0318518 | A1 | 11/2015 | Kim | |
| 2016/0036024 | A1 | 2/2016 | Choi et al. | |
| 2016/0344004 | A1 | 11/2016 | Kepler et al. | |
| 2020/0136106 | A1* | 4/2020 | Johnson .............. | H01M 10/052 |
| 2020/0321577 | A1 | 10/2020 | Kim et al. | |
| 2021/0036269 | A1 | 2/2021 | Lee et al. | |
| 2021/0265685 | A1 | 8/2021 | Jeong et al. | |

FOREIGN PATENT DOCUMENTS

| | | | |
|---|---|---|---|
| JP | 2007035469 | A | 2/2007 |
| JP | 4953678 | B2 | 6/2012 |
| JP | 2016181475 | A | 10/2016 |
| JP | 2020050439 | A | 4/2020 |
| JP | 2021517341 | A | 7/2021 |
| KR | 20090076364 | A | 7/2009 |
| KR | 20110039012 | A | 4/2011 |
| KR | 20130114624 | A | 10/2013 |
| KR | 20140133218 | A | 11/2014 |
| KR | 101472202 | B1 | 12/2014 |
| KR | 20160036339 | A | 4/2016 |
| KR | 20190004641 | A | 1/2019 |
| KR | 20190123059 | A | 10/2019 |
| KR | 102275273 | B1 | 7/2021 |
| KR | 102298291 | B1 | 9/2021 |
| KR | 102314732 | B1 | 10/2021 |
| KR | 20210126216 | A | 10/2021 |
| WO | 2021168746 | A1 | 9/2021 |

OTHER PUBLICATIONS

Extended European Search Report including Written Opinion for Application No. 22890253.2 dated Dec. 17, 2024. 7 pages.

* cited by examiner

POUCH FOR SECONDARY BATTERY FORMED OF MULTIPLE POUCHES, AND SECONDARY BATTERY INCLUDING THE SAME

CROSS-REFERENCE TO RELATED APPLICATIONS

The present application is a continuation-in-part of International Application No. PCT/KR2022/016345 filed on Oct. 25, 2022, which claims priority from Korean Patent Application No. 10-2021-0149043, filed Nov. 2, 2021, all of which are hereby incorporated herein by reference in its entirety.

TECHNICAL FIELD

The present disclosure relates to a pouch for a secondary battery formed of a plurality of pouches, and a secondary battery including the pouch.

BACKGROUND ART

With an increasing need for alternative energy, research into techniques and development for power generation technologies based on energy sources such as solar heat, water power, wind power, ocean energy, and biomass energy, which have little impact on the environmental pollution, are carried out. In particular, research on secondary batteries that can be repeatedly charged are actively carried out, and development is carried out on aspects such as the materials, efficiency, structures, stability, and systems of the secondary batteries.

Various types of secondary batteries, such as a pouch type, a prismatic type, and a cylindrical type, are applied to electronic systems such as vehicles, mobile phones, and notebook computers. The electronic systems may be packed/sealed and utilized according to packing/sealing methods corresponding to the types, respectively. In the aspects of the structural rigidity and stability of the electronic systems to which the secondary batteries are applied, management of packing and sealing the secondary batteries is necessary, and structures for packing and sealing are proposed.

In the case of the pouch type secondary batteries, there are proposals for various methods and structures for sealing a plurality of regions of a pouch for the management of sealing the secondary batteries, and there are proposals for degassing methods and devices for internal pressure management of the secondary batteries.

According to the related art, in the case of the pouch type secondary batteries, a degree of rigidity of the pouch is difficult to determine or adjust and thus, structural rigidity may be difficult to manage when defects occur in battery management systems or during the packing.

According to the related art, when the internal pressure increases during utilizing the secondary batteries in the electronic systems, it may be difficult to adaptively maintain the degree of structural rigidity of the pouch against the increase in internal pressure of the secondary batteries.

DISCLOSURE OF THE INVENTION

Technical Problem

The present disclosure is for resolving the above problems provides a pouch for a secondary battery, to which a structure capable of variously establishing a degree of structural rigidity and adapting to a change in internal pressure is applied to make management of sealing and internal pressure easier, and a secondary battery including the pouch.

Technical Solution

A pouch for a secondary battery according to the present disclosure may include: a plurality of pouches that accommodate an electrode assembly; and a spring part that is coupled to the outermost pouch of the plurality of pouches and determines a degree of structural rigidity of the outermost pouch.

At least one hole may be formed in the outermost pouch, and the spring part may be coupled to the at least one hole.

Each of the plurality of pouches may include an outer resin layer, an inner resin layer, and a thin metal layer disposed between the outer resin layer and the inner resin layer.

At least one hole may be formed in each of the plurality of pouches.

A hole formed in one pouch of the plurality of pouches may not overlap a hole formed in another pouch surrounding the one pouch.

The spring part may include a spring, and the spring part may determine the degree of the structural rigidity on the basis of an elastic force determined according to a characteristic of the spring.

The characteristic may be at least one of a spring material, a spring thickness, or a spring length, and the elastic force may be determined by a change of at least one of the spring material, the spring thickness, or the spring length.

A secondary battery according to the present disclosure may include: an electrode assembly in which an electrode and a separator are stacked alternately; a plurality of pouches that surround the electrode assembly and seal the electrode assembly; and a spring part that is coupled to the outermost pouch of the plurality of pouches and determines a degree of the structural rigidity of the outermost pouch.

A pouch for a secondary battery according to the present disclosure may include: a plurality of pouches that accommodate an electrode assembly; an open portion formed at one side of the outermost pouch of the plurality of pouches and passing through a portion of the one side; and a spring part that is coupled to both ends of the open portion and determines a degree of structural rigidity of the outermost pouch.

The open portion may be formed in a circumferential direction of the one side and have a length that is ⅓ or less of a length of the one side.

The spring part may include a spring, and the spring part may determine the degree of the structural rigidity on the basis of an elastic force determined according to a characteristic of the spring.

The characteristic may be at least one of a spring material, a spring thickness, or a spring length, and the elastic force may be determined by a change of at least one of the spring material, the spring thickness, or the spring length.

A secondary battery according to the present disclosure may include: an electrode assembly in which an electrode and a separator are stacked alternately; a plurality of pouches that surround the electrode assembly and seal the electrode assembly; an open portion formed at one side of the outermost pouch of the plurality of pouches and passing through a portion of the one side; and a spring part that is coupled to both ends of the open portion and determines a degree of structural rigidity of the outermost pouch.

Advantageous Effects

According to the present disclosure, the structure in which the plurality of pouches surround the electrode assembly may be proposed to improve the degree of the fundamental structural rigidity of the secondary battery.

According to the present disclosure, the spring part capable of determining the degree of the structural rigidity may be coupled to the outermost pouch of the plurality of pouches and accordingly, the adaptability to the degree of the structural rigidity of the secondary battery may be improved.

According to the present disclosure, the holes may be formed in each of the plurality of pouches and accordingly, the management of the internal pressure and the electrolyte of the secondary battery may be easier.

According to the present disclosure, the stable structural rigidity may be provided by the pouch itself even when the defects exist in the secondary battery management system or the packing itself.

MODE FOR CARRYING OUT THE INVENTION

Figure 1:
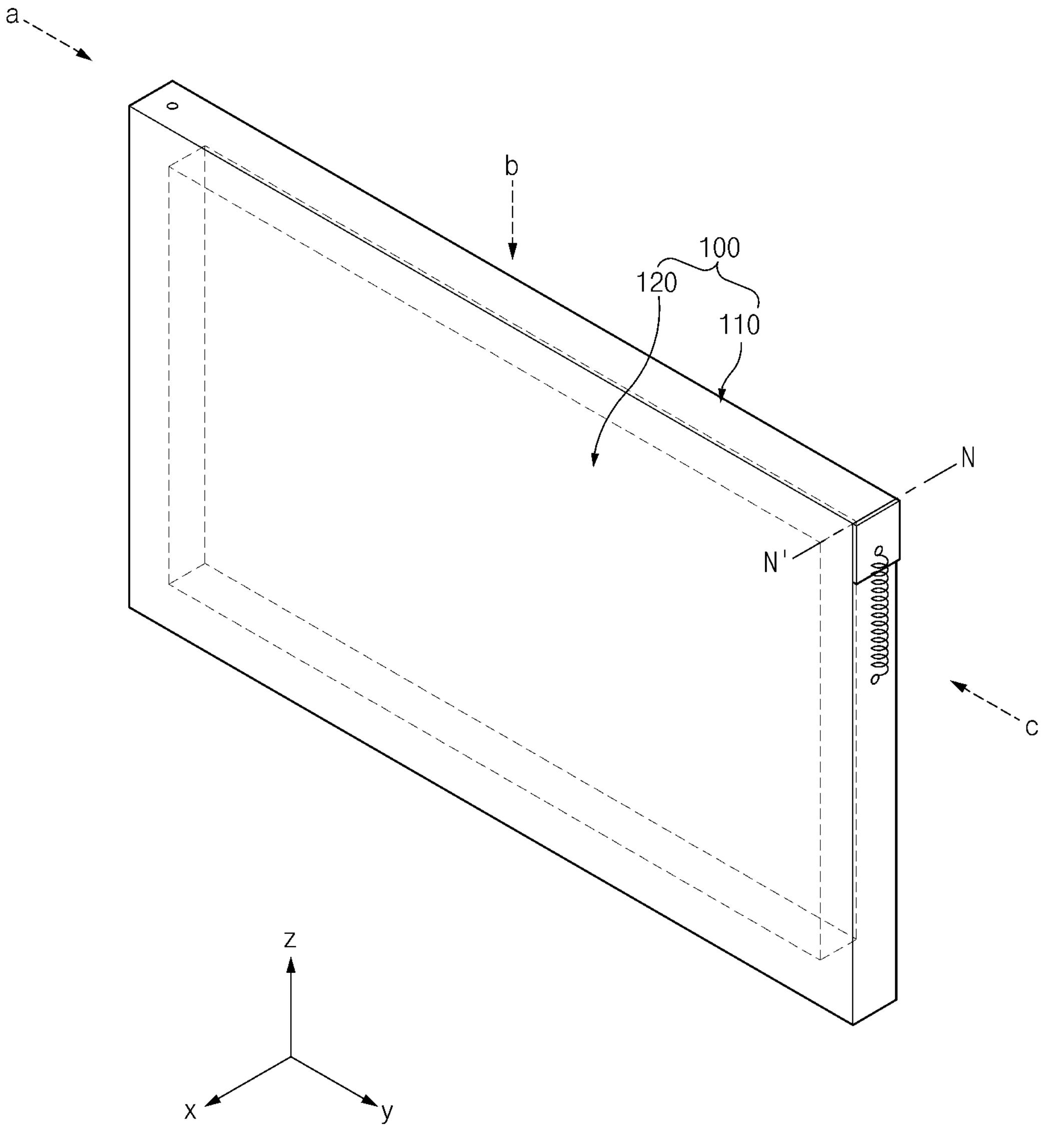
FIG. 1 is a view illustrating a secondary battery according to an embodiment of the present invention.

Hereinafter, embodiments of the present invention will be described in detail with reference to the accompanying drawings to enable those skilled in the art to which the present disclosure pertains to easily carry out an embodiment of the present invention. The present disclosure may, however, be embodied in different forms and should not be construed as limited by the embodiments set forth herein.

The parts unrelated to the description, or the detailed descriptions of related well-known art that may unnecessarily obscure subject matters of the present disclosure, will be ruled out in order to clearly describe embodiments of the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

FIG. 1 illustrates a secondary battery according to an embodiment of the present invention.

A secondary battery 100 may include an electrode assembly 120 therein, which is formed by stacking an electrode and a separator alternately.

The secondary battery 100 may include a pouch 110. For example, the pouch 110 may form an outer appearance of the secondary battery 100. For another example, the pouch 110 may include a plurality of pouches.

The pouch 110 may surround the electrode assembly 120 in the secondary battery 100. For example, the pouch 110 may seal the electrode assembly 120 while surrounding the electrode assembly 120. For another example, an accommodation part capable of accommodating the electrode assembly 120 may be formed in the secondary battery 100, and the pouch 110 may seal the accommodation part (or the electrode assembly 120 accommodated in the accommodation part) in a shape surrounding the accommodation part.

The pouch 110 may be formed of the plurality of pouches, and the plurality of pouches may surround the electrode assembly 120. The plurality of pouches may seal the electrode assembly 120 while surrounding the electrode assembly 120. The plurality of pouches may seal the electrode assembly 120 while sequentially surrounding the electrode assembly 120 (or the accommodation part).

The pouch 110 may include an outer resin layer, an inner resin layer, and a thin metal layer disposed between the outer resin layer and the inner resin layer. When the pouch 110 are formed of the plurality of pouches, the plurality of pouches may each include the outer resin layer, the inner resin layer, and the thin metal layer disposed between the outer resin layer and the inner resin layer.

At least one hole for discharging gas generated in the electrode assembly 120 or adjusting internal pressure may be formed in the pouch 110.

When the pouch 110 are formed of the plurality of pouches, the at least one hole may be formed in each of the plurality of pouches.

A spring part configured to adjust a degree of structural rigidity (or sealing force) of the pouch 110 may be coupled to the at least one hole formed in the pouch 110.

Figure 2:
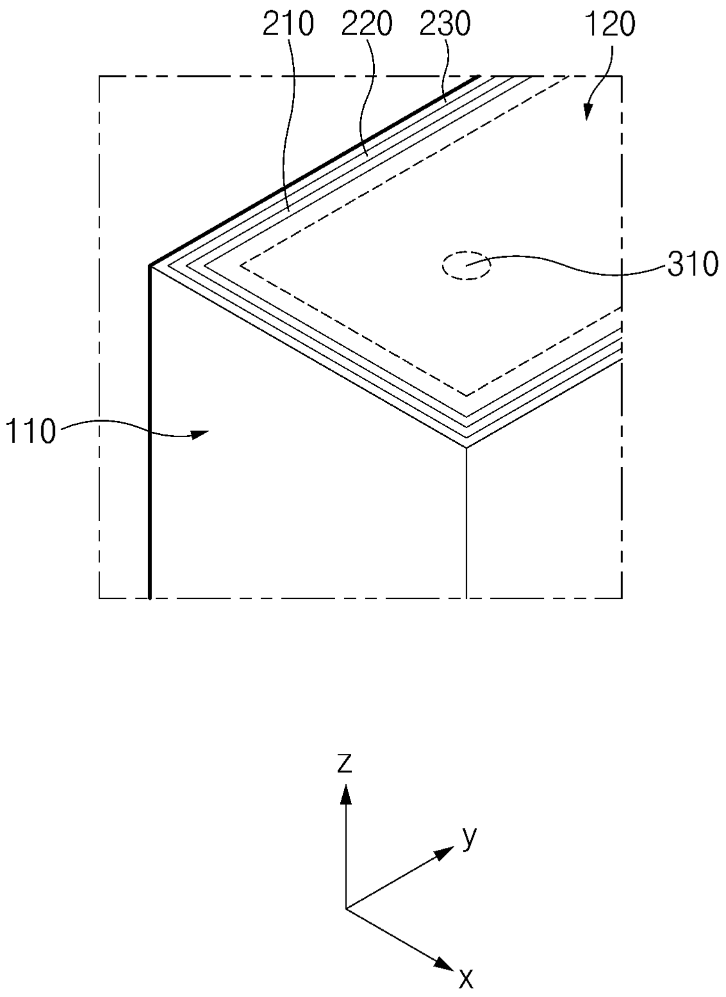
FIG. 2 is an enlarged view of a secondary battery according to an embodiment of the present invention when viewed in a diagonal direction (e.g., in a direction a).

FIG. 2 illustrates an enlarged view of a secondary battery according to an embodiment of the present invention when viewed in a diagonal direction (e.g., in a direction a). FIG. 2 is a perspective view of a secondary battery 100 when viewed in the direction a (e.g., in the diagonal direction from a Z-axis direction toward a Y-axis direction).

The secondary battery 100 may include an electrode assembly 120 therein, and a pouch 110 may surround the electrode assembly 120.

An accommodation part capable of accommodating the electrode assembly 120 may be formed in the secondary battery 100, and the electrode assembly 120 may be accommodated in the accommodation part.

The pouch 110 may have a shape surrounding the electrode assembly 120 and/or the accommodation part.

The pouch 110 may be formed of a plurality of pouches. For example, the pouch 110 may include a first pouch 210, a second pouch 220, and a third pouch 230. For a specific example, the first pouch 210 may surround the electrode assembly 120 (or the accommodation part), the second pouch 220 may surround the first pouch 210, and the third pouch 230 may surround the second pouch 220.

When the pouch 110 is formed of the plurality of pouches, the pouch 110 at the outermost side may be termed the outermost pouch. For example, when the first pouch 210 surrounds the electrode assembly 120, and the second pouch 220 surrounds the first pouch 210, and the third pouch 230 surrounds the second pouch 220, the third pouch 230 may be the outermost pouch. For another example, when the pouch 110 is formed of two pouches, one of which is the first pouch 210 surrounding the electrode assembly 120 (or the accommodation part) and the other of which is the second pouch 220 surrounding the first pouch 210, the second pouch 220 may be the outermost pouch.

At least one hole (e.g., a hole 310) may be formed in the pouch 110. When the pouch 110 is formed of the plurality of pouches, the at least one hole may be formed in each of the plurality of pouches.

The plurality of pouches described above are three in number. However, this is an example, and the plurality of pouches may be two, or four or more in number.

The same/similar explanation based on the assumption that the pouch 110 is formed of three pouches may also apply to the cases in which the pouch 110 is formed of two pouches and/or four or more pouches.

Figure 3:
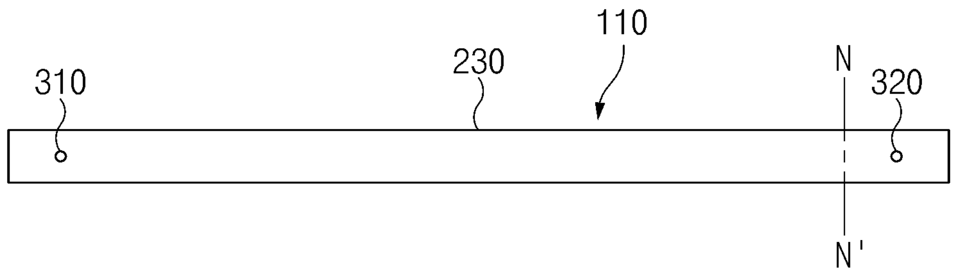
FIG. 3 is a plan view of a secondary battery according to an embodiment of the present invention when viewed from above (e.g., in a direction b).

FIG. 3 is a plan view of a secondary battery according to an embodiment of the present invention when viewed from above (e.g., in a direction b). FIG. 3 illustrates a secondary battery 100 when viewed in the direction b (e.g., a direction when viewed in the Z-axis direction).

A hole 310 may be formed at one side of a pouch 110 (or a third pouch 230 that is the outermost pouch), and a hole 320 may be formed at the other side of the pouch 110 (or the third pouch 230 that is the outermost pouch). The positions of the hole 310 and the hole 320 illustrated in FIG. 3 are examples, and the hole 310 and the hole 320 may be formed in different positions according to a design.

Referring to FIG. 3, a line N-N' may be a folding line. Although an unfolded view is illustrated for convenience of explanation, the other side at which the hole 320 is formed can be folded on the basis of the line N-N' with respect to the one side at which the hole 310 is formed.

The hole 310 and the hole 320 may be holes formed in the third pouch 230 that is the outermost pouch, and holes may be formed in not only the outermost pouch but also other pouches of the pouch 110.

Figure 4:
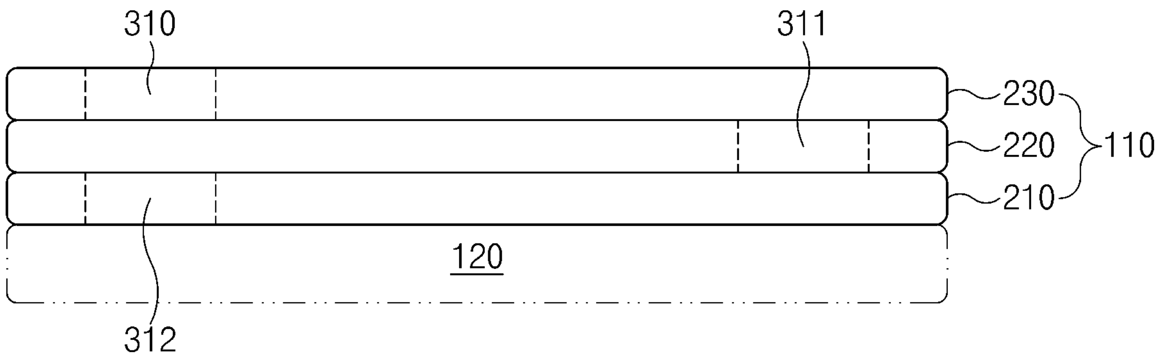
FIG. 4 is a view illustrating a structure of a plurality of pouches of a secondary battery according to an embodiment of the present invention.

FIG. 4 illustrates a structure of a plurality of pouches of a secondary battery according to an embodiment of the present invention. FIG. 4 illustrates a stacked structure of a pouch 110 formed of a plurality of pouches.

The pouch 110 may include a plurality of pouches. For example, the pouch 110 may surround an electrode assembly 120, and the plurality of pouches may surround the electrode assembly 120. For another example, an accommodation part capable of accommodating the electrode assembly 120 may be formed in a secondary battery 100, and the pouch 110 may have a shape surrounding the accommodation part.

When the pouch 110 is formed of three pouches, the pouch 110 may have a shape in which a first pouch 210 surrounds the electrode assembly 120 (or the accommodation part), a second pouch 220 surrounds the first pouch 210, and a third pouch 230 surrounds the second pouch 220.

As illustrated in FIG. 4, the stacked cross-sectional structure of the pouch 110 formed of three pouches may have a shape in which the second pouch 220 is stacked on the first pouch 210 and the third pouch 230 is stacked on the second pouch 220.

The outermost pouch of the pouch 110 formed of three pouches may be the third pouch 230, and at least one hole 310 may be formed in the third pouch 230.

At least one hole 312 may be formed in the first pouch 210, and at least one hole 311 may be formed also in the second pouch 220.

The hole 311 of the second pouch 220 may not overlap the hole 312 of the first pouch 210 and/or the hole 310 of the third pouch 230. For example, the hole 311 of the second pouch 220 may be misaligned with the hole 312 and the hole 310 and accordingly, an electrolyte inside the pouch 110 may not easily leak.

The at least one hole (e.g., the hole 312, the hole 311, and the hole 310) is formed in each of the plurality of pouches (e.g., the first pouch 210, the second pouch 220, and the third pouch 230) so that when the pressure in the pouch 110 of the secondary battery 100 increases, gas may be discharged to the outside of the pouch 110 through the foregoing holes to decrease the internal pressure.

The arrangement of the holes (e.g., the hole 310, the hole 311, and the hole 312), illustrated in FIG. 4, is an example, and the arrangement of the holes may be different from the arrangement illustrated according to the design.

Figure 5:
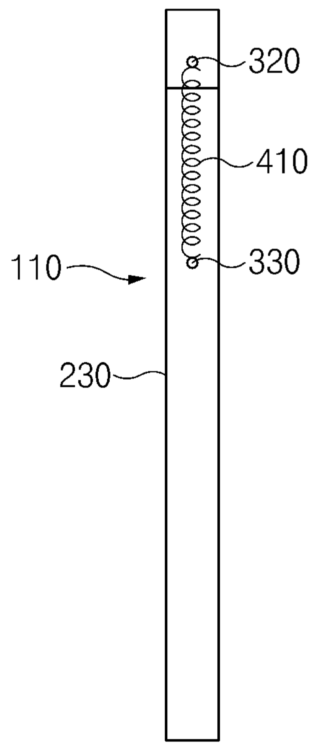
FIG. 5 is a side view of a secondary battery according to an embodiment when viewed from a side (e.g., in a direction c).

FIG. 5 illustrates a side view of a secondary battery according to an embodiment when viewed from a side (e.g., in a direction c). FIG. 5 illustrates a secondary battery 100 when viewed in the direction c (e.g., the direction when viewed in the Y-axis direction).

At least one hole may be formed at the other side of a pouch 110. For example, a hole 320 and a hole 330 may be formed.

When the pouch 110 is formed of three pouches, the at least one holes (e.g., the hole 320 and the hole 330) may be formed in a third pouch 230 that is the outermost pouch.

A spring part 410 may be coupled to the at least one holes (e.g., the hole 320 and the hole 330) formed in the pouch 110 (or the third pouch 230 that is the outermost pouch). For example, the spring part 410 may have both ends, one of which is coupled to the hole 320 and the other of which is coupled to the hole 330.

The spring part 410 may at least include a spring. The spring may have both ends, one of which is coupled to the hole 320 and the other of which is coupled to the hole 330. For example, the spring part 410 may be coupled and fixed to the holes (e.g., the hole 320 and the hole 330). For another example, the both ends of the spring of the spring part 410 may be coupled to the holes (e.g., the hole 320 and the hole 330), respectively, in a hooking shape like a hook (e.g., hook-coupling).

The spring included in the spring part 410 may have an elastic force that is determined according to a characteristic of the spring (e.g., the material of the spring, the thickness of the spring, the length of the spring, etc.). For example, as an elastic modulus determined according to the material of the spring, the thickness of the spring, the length of the spring, etc., is higher, the elastic force may be higher.

The spring part 410 may be coupled to the holes (e.g., the hole 320 and the hole 330) and provide a degree of structural rigidity to the pouch 110. For example, when the spring part 410 includes a spring having a high elastic modulus, a higher elastic force may be applied compared to when including a spring having a low elastic modulus. As the elastic force of the spring part 410 increases, the degree of the structural rigidity of the pouch 110 may be increased.

In this disclosure, a predetermined pre-tension may be applied to the spring part 410. If pre-tension is applied to the spring part 410, both ends of the spring part 410 can apply a predetermined force to the portion where the hole 320 is formed and the portion where the hole 330 is formed in the pouch 110.

In this disclosure, the predetermined force may be applied in a direction in which the portion of the pouch 110 where the hole 320 is formed and the portion where the hole 330 is formed become closer to each other. This force causes the pouch 110 to retract, thereby supplementing the sealing force of the pouch 110 surrounding the electrode assembly 120 (or the accommodation part). To explain a more specific example, the sealing force is the sum of the force by which the pouch 110 surrounds the electrode assembly 120 (or the accommodation part) and the force by which the spring part 410 retracts the pouch 110. Therefore, the structural rigidity and sealing force of the pouch 110 can be controlled by adjusting the pre-tension applied to the spring part 410.

In this disclosure, the degree to which the spring part 410 supplements the sealing force of the pouch 110 can be appropriately adjusted as needed. For example, in a situation where abnormal behavior occurs inside the pouch 110, it may be desirable for the sealing force of the pouch 110 to loosen and the electrolyte inside to leak to the outside. Therefore, the sealing force supplemented by the spring part 410 is preferably adjusted to a degree that complements the sealing force of the pouch 110 to some extent in a normal state, but does not prevent leakage of the electrolyte in an abnormal state.

If necessary, separate pre-tension may be provided without being previously applied to the spring unit 410.

Figure 6:
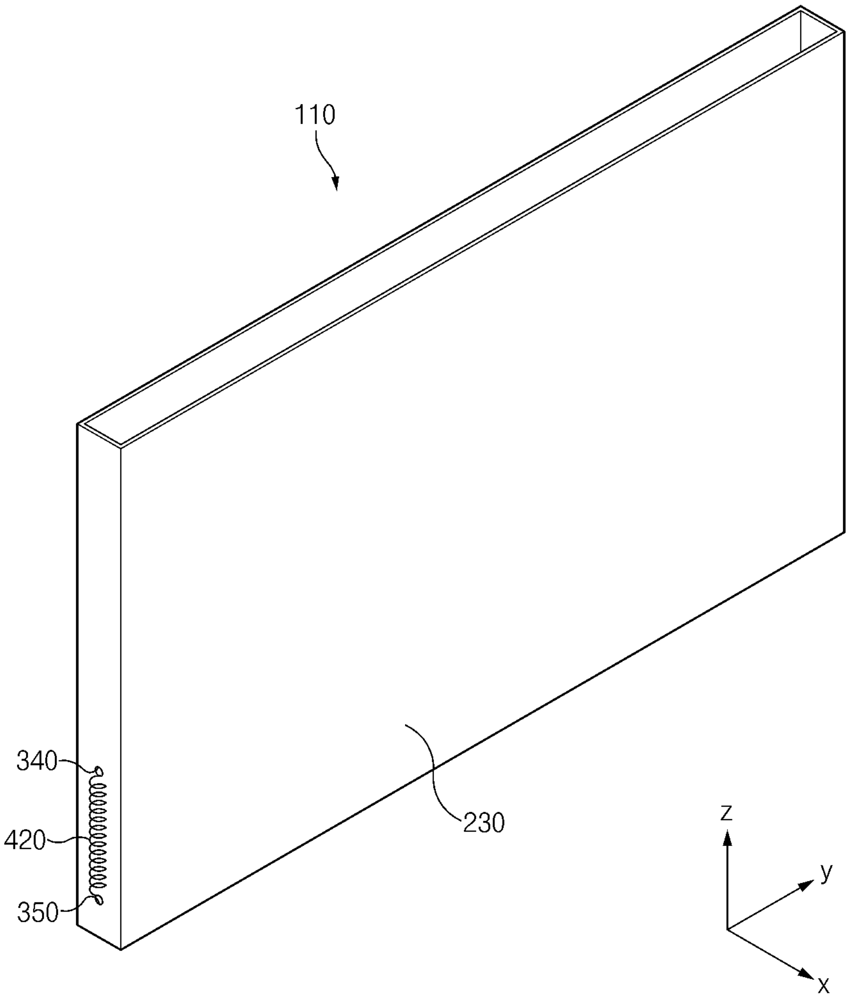
FIG. 6 is a view illustrating a secondary battery according to another embodiment of the present invention.

FIG. 6 illustrates a secondary battery according to another embodiment of the present invention.

A pouch 110 of a secondary battery 100 according to another embodiment may not have a portion to be folded.

The secondary battery 100 may include the pouch 110. For example, the secondary battery 100 may include the pouch 110 including a plurality of pouches, and the pouch 110 may surround an electrode assembly (e.g., the electrode assembly 120) therein. For another example, an accommodation part capable of accommodating the electrode assembly 120 may be formed in the secondary battery 100, and the pouch 110 may have a shape surrounding the accommodation part. Each of the plurality of pouches may include an outer resin layer, an inner resin layer, and a thin metal layer disposed between the outer resin layer and the inner resin layer.

When the pouch 110 is formed of three pouches, the outermost pouch may be a third pouch 230.

At least one hole may be formed in the pouch 110 (or the outermost pouch). For example, a hole 340 and a hole 350 may be formed at one side of the pouch.

The at least one hole formed in the pouch 110 is not limited by the one side of the pouch, and may be formed at the other side. For example, when the pouch 110 has a plurality of surfaces, the at least one hole is not limited by a surface at the one side, and may be formed in the other surfaces.

A spring part 420 may be coupled to the at least one hole (e.g., the hole 340 and the hole 350) formed at the one side of the pouch 110. For example, the spring part 420 may have both ends, one of which is coupled to the hole 340 and the other of which is coupled to the hole 350. For another example, the spring part 420 may include a spring, and the spring may have both ends, one of which is coupled to the hole 340 and the other of which is coupled to the hole 350. The spring part 420 or the spring included in the spring part 420 may be coupled to the holes (e.g., the hole 340 and the hole 350) in a hooking shape like a hook (e.g., hook-coupling).

The spring included in the spring part 420 may have an elastic force that is determined according to a characteristic of the spring (e.g., the material of the spring, the thickness of the spring, the length of the spring, etc.). For example, as an elastic modulus determined according to the material of the spring, the thickness of the spring, the length of the spring, etc., is higher, the elastic force is higher.

The spring part 420 may be coupled to the holes (e.g., the hole 340 and the hole 350) and provide a degree of structural rigidity to the pouch 110. For example, when the spring part 420 includes a spring having a high elastic modulus, a higher elastic force may be applied compared to when including a spring having a low elastic modulus. As the elastic force of the spring part 420 increases, the degree of the structural rigidity of the pouch 110 may be increased.

Meanwhile, pre-tension may be applied to the spring part 420 of the secondary battery 100 according to this embodiment. At this time, the pre-tension may be operated in the same manner as the pre-tension described in relation to the spring part 410 shown in FIG. 6. By adjusting the pre-tension of the spring part 420, the structural rigidity and sealing force of the pouch 110 can be controlled.

Figure 7:
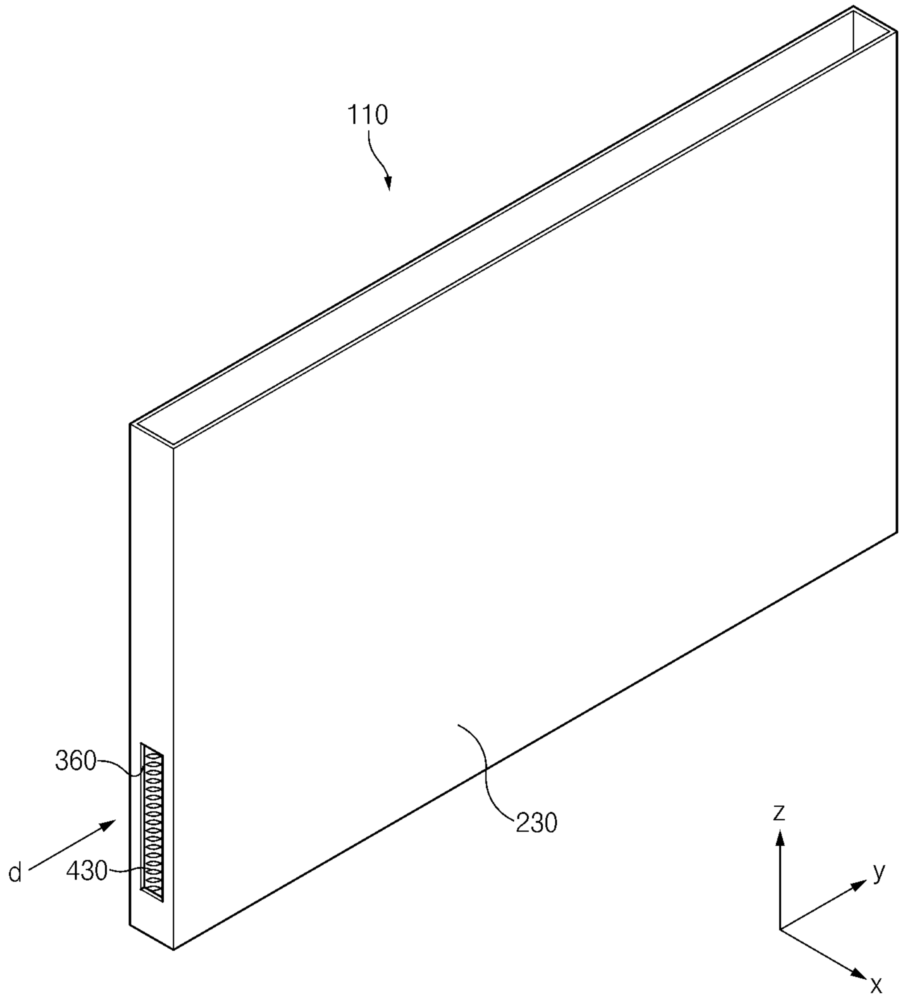
FIG. 7 is a view illustrating a secondary battery according to further another embodiment of the present invention.

FIG. 7 illustrates a secondary battery according to further another embodiment of the present invention.

An electrode assembly (e.g., the electrode assembly 120) may be accommodated in a secondary battery 100. For example, an accommodation part capable of accommodating the electrode assembly 120 may be formed in the secondary battery 100, and the electrode assembly 120 may be accommodated in the accommodation part.

The secondary battery 100 may include a pouch 110. For example, the pouch 110 may surround the electrode assembly (e.g., the electrode assembly 120) or the accommodation part in the secondary battery 100.

The pouch 110 may be formed of a plurality of pouches. For example, the plurality of pouches may surround the electrode assembly (e.g., the electrode assembly 120) or the accommodation part in the secondary battery 100. For another example, each of the plurality of pouches may include an outer resin layer, an inner resin layer, and a thin metal layer disposed between the outer resin layer and the inner resin layer.

The pouch 110 (or the plurality of pouches) may seal the electrode assembly (e.g., the electrode assembly 120) or the accommodation part. For example, the pouch 110 (or the plurality of pouches) may have a shape surrounding the electrode assembly (e.g., the electrode assembly 120) or the accommodation part, and accordingly, the electrode assembly (e.g., the electrode assembly 120) or the accommodation part may be sealed.

When the pouch 110 is formed of the plurality of pouches, an open portion may be formed in the outermost pouch of the plurality of pouches. For example, when the pouch 110 is formed of three pouches, an open portion 360 may be formed at one side of the outermost pouch (e.g., the third pouch 230). For another example, the open portion 360 may be formed in a longitudinal direction of the outermost pouch (e.g., the third pouch 230). The open portion 360 may pass through a portion of the one side of the outermost pouch (e.g., the third pouch 230).

The open portion 360 may have both ends to which a spring part 430 is coupled. For example, the spring part 430 may be coupled to the both ends of the open portion 360, and provide a degree of structural rigidity of the outermost pouch (e.g., the third pouch 230).

Figure 8:
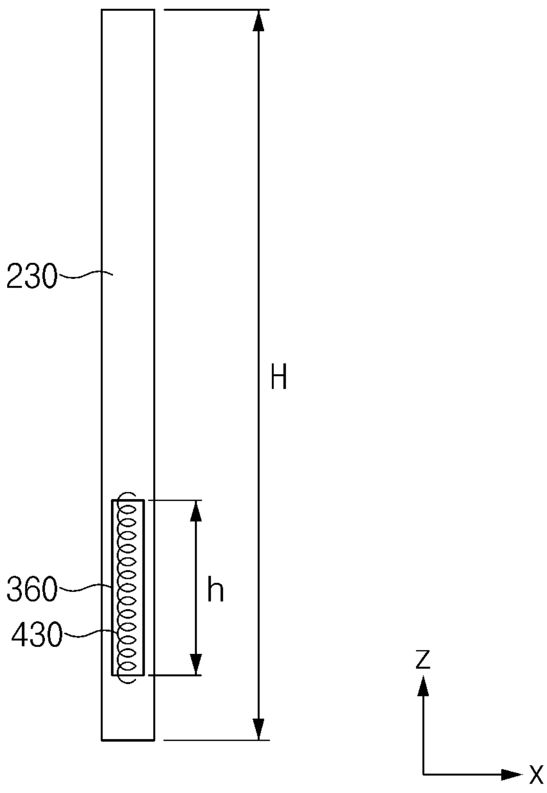
FIG. 8 is a side view of a secondary battery according to further another embodiment of the present invention when viewed from a side (e.g., in a direction d).

FIG. 8 illustrates a side view of a secondary battery according to further another embodiment of the present invention when viewed from a side (e.g., in a direction d). FIG. 8 illustrates a side surface of a pouch 110 of a secondary battery 100 in the direction d (e.g., a direction from a negative (−) Y-axis direction to a positive (+) Y-axis direction).

An open portion may be formed at one side of the outermost pouch (e.g., the third pouch 230) of the pouch 110. For example, an open portion 360 may be formed in a longitudinal direction of the one side of the outermost pouch (e.g., the third pouch 230).

The open portion 360 may have a length that is ⅓ or less of the length of the one side of the outermost pouch (e.g., the third pouch 230). For example, when the one side of the outermost pouch (e.g., the third pouch 230) has a length H, the open portion 360 may have a length h that is ⅓H or less.

The open portion 360 may have both ends to which a spring part 430 is coupled. For example, one end of the spring part 430 may be coupled to one end of the open portion 360, and the other end of the spring part 430 may be coupled to the other end of the open portion 360.

The spring part 340 may include a spring.

The spring of the spring part 430 may have one end coupled to the one end of the open portion 360, and the other end coupled to the other end of the open portion 360.

A degree of structural rigidity of the pouch 110 (or the outermost pouch 230) may be provided based on an elastic force determined according to a characteristic of the spring part 430 or the spring included in the spring part 430. For example, the elastic force of the spring included in the spring part 420 may be determined according to the characteristic of the spring (e.g., the material of the spring, the thickness of the spring, the length of the spring, etc.). For example, as an elastic modulus determined according to the material of the spring, the thickness of the spring, the length of the spring, etc., is higher, the elastic force be higher.

The spring part 430 may be coupled to the open portion 360 and provide a degree of the structural rigidity to the pouch 110. For example, when the spring part 430 includes a spring having a high elastic modulus, the higher elastic force may be applied compared to when including a spring having a low elastic modulus. As the elastic force of the spring part 430 or the spring increases, the degree of the structural rigidity of the pouch 110 may be increased.

Meanwhile, pre-tension may be applied to the spring portion 430 of the secondary battery 100 according to this embodiment. At this time, the pre-tension may be operated in the same manner as the pre-tension described in relation to the spring portion 410 shown in FIG. 6. By adjusting the pre-tension of the spring portion 430, the structural rigidity and sealing force of the pouch 110 can be controlled.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

DESCRIPTION OF THE SYMBOLS

100: Secondary battery
110: A plurality of pouches
120: Electrode assembly
210: First pouch
220: Second pouch
230: Third pouch
310: Outermost hole
311: Hole
312: Hole
320: Outermost hole
330: Outermost hole
340: Outermost hole
350: Outermost hole
360: Open portion
410: Spring part
420: Spring part
430: Spring part

The invention claimed is:

1. A pouch for a secondary battery, comprising:
a plurality of nested pouches configured to accommodate an electrode assembly; and
a spring part coupled to an outermost pouch of the plurality of nested pouches, the spring part configured to provide a degree of structural rigidity to the outermost pouch.

2. The pouch for a secondary battery of claim 1, wherein at least one hole is formed in the outermost pouch, and
the spring part is coupled to the at least one hole.

3. The pouch for a secondary battery of claim 1, wherein each of the plurality of pouches comprises an outer resin layer, an inner resin layer, and a thin metal layer disposed between the outer resin layer and the inner resin layer.

4. The pouch for a secondary battery of claim 1, wherein at least one hole is formed in each of the plurality of pouches.

5. The pouch for a secondary battery of claim 4, wherein the at least one hole formed in a first one of the plurality of pouches does not overlap the at least one hole formed in a second one of the plurality of pouches, the second pouch surrounding the first pouch.

6. The pouch for a secondary battery of claim 1, wherein the spring part comprises a spring, and
the spring part provides the degree of structural rigidity to the outermost pouch based on an elastic force of the spring determined by a characteristic of the spring.

7. The pouch for a secondary battery of claim 6, wherein the characteristic of the spring is at least one of a material of the spring, a thickness of the spring, or a length of the spring.

8. A secondary battery comprising:
an electrode assembly in which an electrode and a separator are alternately stacked;
a plurality of nested pouches configured to surround the electrode assembly and seal the electrode assembly; and
a spring part coupled to an outermost pouch of the plurality of nested pouches, the spring part configured to provide a degree of structural rigidity to the outermost pouch.

9. A pouch for a secondary battery, comprising:
a plurality of nested pouches configured to accommodate an electrode assembly;
an open portion formed at one side of an outermost pouch of the plurality of nested pouches and passing through a portion of the one side; and
a spring part coupled to both ends of the open portion and configured to provide a degree of structural rigidity to the outermost pouch.

10. The pouch for a secondary battery of claim 9, wherein the open portion is formed in a circumferential direction and has a length that is ⅓ or less of a length of the one side.

11. The pouch for a secondary battery of claim 9, wherein the spring part comprises a spring, and the spring part provides the degree of structural rigidity based on an elastic modulus determined by a characteristic of the spring.

12. The pouch for a secondary battery of claim 11, wherein the characteristic is at least one of spring material of the spring, a thickness of the spring, or a length of the spring.

13. A secondary battery comprising:

the pouch of claim 9; and the electrode assembly in which an electrode and a separator are alternately stacked;

a plurality of pouches configured to surround the electrode assembly and seal the electrode assembly;

an open portion formed at one side of the outermost pouch of the plurality of pouches and passing through a portion of the one side; and a spring part coupled to both ends of the open portion and configured to determine a degree of structural rigidity of the outermost pouch.

14. The pouch for a secondary battery of claim 1, wherein pre-tension is applied to the spring part, so that the pouch is retracted while wrapping the electrode assembly.

* * * * *